United States Patent [19]

Herman

[11] 4,302,026
[45] Nov. 24, 1981

[54] CABLE FOR TOWING VEHICLES
[76] Inventor: Melvin J. Herman, 69-36A 215th St., Bayside, N.Y. 11364
[21] Appl. No.: 48,993
[22] Filed: Jun. 15, 1979
[51] Int. Cl.³ .............................................. B60D 1/18
[52] U.S. Cl. .................................. 280/491 F; 335/219
[58] Field of Search ........................... 280/480, 491 F; 335/219; 213/75 D; 180/313; 294/88, 65.5; 307/9, 10 R; 114/242, 243; 242/86.5 R

[56] References Cited
U.S. PATENT DOCUMENTS 1,695,096  12/1928  Hanses .................................. 280/480
3,967,133  6/1976   Bokern ................................. 307/10 R

FOREIGN PATENT DOCUMENTS 89988  3/1896  Fed. Rep. of Germany ..... 294/65.5

Primary Examiner—Joseph F. Peters, Jr.
Assistant Examiner—Randall A. Schrecengost
Attorney, Agent, or Firm—Stephen E. Feldman; Marvin Feldman

[57] ABSTRACT

A cable for towing vehicles comprises a cable device having ends adaptably secured to respective vehicles. A magnetic apparatus is operatively associated with the cable device for selectively connecting and disconnecting the cable device to the vehicles.

5 Claims, 5 Drawing Figures

CABLE FOR TOWING VEHICLES

BACKGROUND OF THE INVENTION

While the invention is subject to a wide range of applications, it is especially suited for use in a towing system and will be particularly described in that connection.

In the towing of one automotive vehicle by another, a chain, rope or wire cable is frequently used and is often secured to one or both vehicles by connecting it to a frame extension member or some part of the bumper. When the towing line is secured to the vehicle, it often requires a rather complicated hitching device which may involve a complicated and often tedious procedure to secure the tow line. One solution to this problem has been to provide a hitching device of the type shown in U.S. Pat. No. 2,708,121 to May. This patent discloses for example, "a hitching device which is adjustable to fit substantially all of the bumpers in use on automotive vehicles". The problem still remains, however, because even a simple towing hitch requires careful placing and securing in order that it does not break loose from the vehicle, as well as a bumper or similar device to which it is attached.

Further, in today's modern cars, often the bumpers are actually made of some material such as rubber, or may even be part of the car itself, and therefore, do not provide a place to which a hitch can be attached. Also, many cars have very small bumpers or even no bumpers at all.

It is an object of the present invention to provide a cable for towing vehicles which eliminates all or part of the above-mentioned problems.

It is a further object of the present invention to provide a cable for towing vehicles which is easy to attach to a vehicle.

It is a further object of the present invention to provide a cable for towing vehicles which is relatively easy to manufacture.

It is still a further object of the present invention to provide a cable for towing vehicles which can easily be attached to many places on a vehicle.

SUMMARY OF THE INVENTION

Accordingly, there has been provided a cable for towing vehicles comprising a cable device having ends adaptably secured to respective vehicles. A magnetic apparatus is operatively associated with the cable device for selectively connecting and disconnecting the cable device to the vehicles.

For a better understanding of the present invention, together with other and further objects thereof, reference is made to the following description taken in connection with the accompanying drawings, while its scope will be pointed out in the appended claims.

DESCRIPTION OF THE PREFERRED EMBODIMENT

Figure 1:
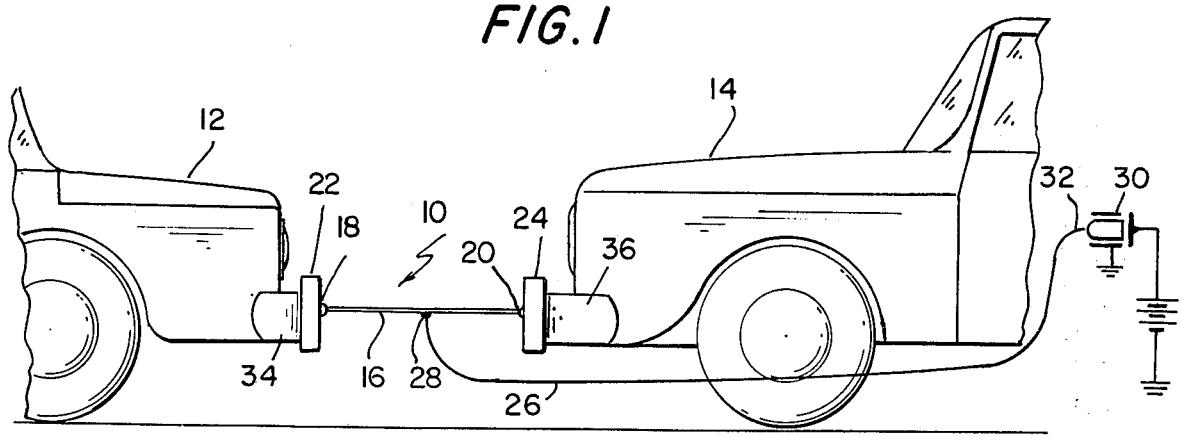
FIG. 1 is an illustration of a cable for towing vehicles in accordance with the present invention.

A cable 10 for towing vehicles 12 and 14 comprises a cable device 16 having ends 18 and 20 which are adaptably secured to the respective vehicles. A magnetic apparatus 22 and 24 is operatively associated with the cable device 16 for selectively connecting and disconnecting the cable device to the vehicles.

Referring to FIG. 1, there is illustrated a cable 10 used for towing two vehicles 12 and 14. The cable may consist of a cable device 16 which is preferably formed from two lengths of wire which are insulated from each other. Each of the lengths may be formed from a strong good conducting material, such as, copper or a copper alloy. The entire cable is preferably covered with a non-conductive material such as, for example, rubber or plastic. The cable will preferably have the quality of being able to be easily wound in order to easily store it in a convenient place such as the trunk of an automobile.

At each end 18 and 20 of the cable device 16 is located a magnetic apparatus 22 and 24 respectively. Each of these magnetic apparatus may be a conventional electromagnet of any desired type well known in the prior art. It is important that the ends of the cable 18 and 20 are attached to the magnetic apparatus 22 and 24 in a very secure way in order that the magnets cannot be easily pulled away from the cable device 16. If desired, the cable device may be first affixed on to the magnet and then the electrical connections made as desired.

A second wire 26 may be connected along the cable device 16 at one end 28 and to a power supply such as the cigarette lighter 30 in one of the vehicles at a second end 32.

Figure 4:
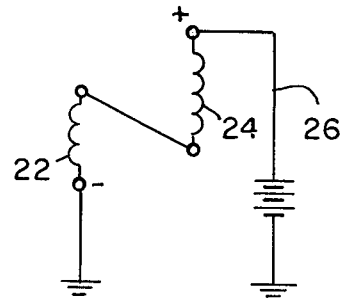
FIG. 4 is a schematic diagram illustrating the wiring of the magnets used on the cable for towing the vehicles in accordance with the present invention.

Referring to FIG. 4, a schematic diagram illustrates a preferred manner of joining the magnets 22 and 24 in series. The wire 26 would provide current to the positive side of the coil of magnet 24. Then the negative side of the coil of magnet 24 would be connected to the positive side of the coil of magnet 22. Finally, the negative side of coil 22 could be connected to a common ground. Of course, it would not be necessary for the cable device 16 to provide a ground but rather the ground of the car itself may suffice. There may be a problem in using the car for a ground in that the magnet may be placed in a position where the connection would be such that the maximum current could not pass through, and thereby weaken the power of the magnet.

In operation, the wire 26 would be attached via its end 32 to a cigarette lighter 30. Then the two magnets 22 and 24 could be placed on suitable places on each car such as for example, bumpers 34 and 36. Of course, in many cases it is not convenient to place a magnet on a bumper since the bumper may be made out of some materials such as for example, rubber or it may not even exist. Therefore, one of the advantages of this invention is that the magnet could be placed on any metal portion of the car such as for example, the frame. It is understood that the power which can be generated from a battery and delivered through the cigarette lighter is somewhat limited and thereby limits the force which can be exerted by the magnets. Thus, the invention is contemplated to be used primarily in situations where a great deal of force may not be required. For instance, the vehicle 12 may be on an ice patch, a snow rut, or in some mud or sand. Then the wheels of the car 12 would be able to deliver power to help move the car and only a small amount of force would be required to help it move to a position where the tires would be able to have traction.

Figure 5:
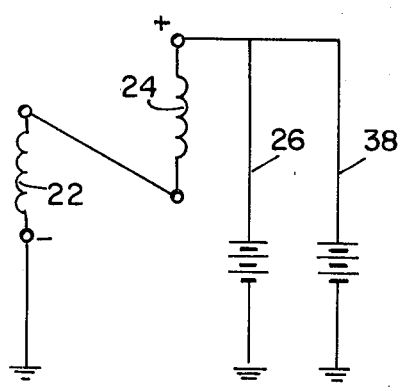
FIG. 5 is a schematic diagram illustrating another manner of wiring the magnets used in the present invention.

In the event that even more power is required to place a stronger force on the magnets, a second wire 38 may be connected between a source of power such as a cigarette lighter in the vehicle 12 to the power input of wire 26 as schematically illustrated in FIG. 5. It is also in the scope of the present invention to wire the magnets together in parallel and either one or both of the input power lines 26 and 38 in either parallel or series as desired.

Figure 2:
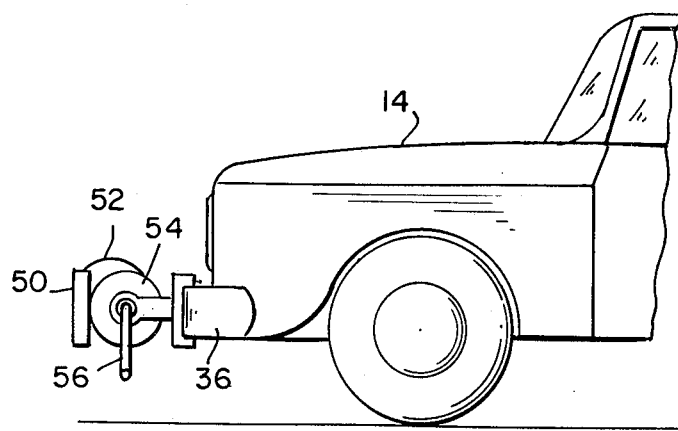
FIG. 2 is an illustration of a second embodiment of the present invention wherein a cable for towing vehicles is attached to one vehicle.
Figure 3:
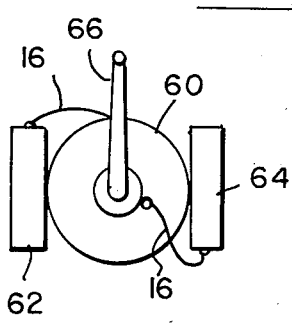
FIG. 3 is an illustration of a third embodiment of the present invention wherein the cable is wound on a reel.

Another embodiment of the present invention as seen in FIG. 2 includes a magnetic apparatus 50 which may be connected to a cable device 52 in the manner described above. The magnet and the cable may be substantially identical to the cable device 16 and the magnetic apparatus 22. The cable is would on a reel 54. The reel 54 is a conventional reel which connects onto the car in any desired place, such as the bumper and thereby provides a convenient way or storing the cable when it is not needed. The reel 54 would have a conventional latching device to allow the magnet to be pulled out the required distance and then lock the reel in place. A wire (not shown) similar to wire 26 illustrated in FIG. 1, would be connected from the cable 52 to a source of power such as a cigarette lighter in car 14. A handle 56 may be provided to rewind the cable 52.

This embodiment has the advantage of being able to keep the cable conveniently and positively secured to the vehicle. Then when it is needed to be used, the magnet can simply be pulled over to the other vehicle and the cable will naturally unwind from the reel 54. When the desired length of cable is reeled out, reel 54 may be locked in place in a conventional manner and the vehicle 14 can pull the other vehicle.

Another embodiment of the present invention includes a conventional reel 60 which carries a cable device 16 as mentioned above. This is a conventional reel which allows the magnet 62 to be pulled away so that the cable 16 connected thereto unwinds from reel 60. The other magnet 64 may be affixed to the reel by the cable 16 so that it does not actually unwind. In use, the magnet 62 can be unwound to the desired position and the reel will latch to prevent further unwinding in a conventional manner. A handle 66 may be provided on the reel 62 wind the cable 16 back on when it is no longer required. Then the entire assembly can easily be stored in the trunk of a vehicle or in any other desired place.

Thus, it can be seen by one skilled in the art that a cable for towing vehicles has been provided which is easy to use, relatively inexpensive to manufacture, and convenient to store.

While there has been described what is at present considered to be a preferred embodiment of the invention, it will be obvious to one skilled in the art that various changes and modifications may be made therein without departing from the invention, and it is, therefore, aimed in the appended claims to cover all such changes and modifications as falls in the true spirit and scope of the invention.

What is claimed is:

1. A cable device for towing vehicles comprising:
   cable means being electrically conductive, a pair of electromagnets one each being securely disposed at opposite ends of said cable, and each electromagnet being formed so as to contact a metal portion of the body of a respective vehicle;
   an electrical wire being electrically connected to said cable and being disposed between said electromagnetics; and power source means to connect said wire to a source of power, whereby when the power is generated, both electromagnetics are held at the same time to respective vehicles for the towing of one vehicle by the other.

2. The cable device of claim 1, said power source means comprising means to connect said wire to a cigarette lighter of at least one of said vehicles.

3. The cable device of claim 2, said power source means connects said wire to both of said vehicles.

4. The cable as set forth in claim 1 further characterized in that said cable means has associated with it reel means for paying the cable out as required.

5. The cable device of claim 4, said wire being connected to said reel means and said reel means being electrically connected to said cable means.

* * * * *